United States Patent [19]

Brandt, Jr.

[11] 4,297,900
[45] Nov. 3, 1981

[54] AVERAGING PITOT PRIMARY SYSTEM

[75] Inventor: Robert O. Brandt, Jr., Garner, N.C.

[73] Assignee: Brandt Industries, Inc.

[21] Appl. No.: 124,340

[22] Filed: Feb. 25, 1980

Related U.S. Application Data

[63] Continuation of Ser. No. 954,892, Oct. 26, 1978, abandoned.

[51] Int. Cl.³ .............................................. G01F 1/46
[52] U.S. Cl. .................................................. 73/861.66
[58] Field of Search ....................................... 73/212, 4

[56] References Cited

U.S. PATENT DOCUMENTS

| | | | |
|---|---|---|---|
| 3,785,206 | 1/1974 | Benson | 73/212 |
| 3,981,193 | 9/1976 | Goulet | 73/212 |
| 4,036,054 | 7/1977 | Goulet | 73/212 |

Primary Examiner—S. Clement Swisher
Attorney, Agent, or Firm—Mills and Coats

[57] ABSTRACT

The present invention entails a branch averaging pitot system for sensing differential pressure within a system of air or gas and providing a differential flow signal to a flow transmitter forming a part of the air monitoring system of the present invention. The branch averaging pitots include an array of shrouded total pressure pitots strategically spaced about the cross sectional area of an air receiving duct assembly and down stream from a honeycomb type air flow straightening section. In addition, an array of static pressure pitots are also provided, and wherein the respective static and total pressure pitots are communicatively connected by separate manifolds internally within the air receiving duct assembly. Openings in the pitots are relatively small (0.030 inches to 0.060 inches), and said transmitter is adapted to continuously direct a flow of purging air therefrom back to and through the pitots in order to keep them open at all times.

3 Claims, 4 Drawing Figures

AVERAGING PITOT PRIMARY SYSTEM

This is a continuation of application Ser. No. 954,892, filed Oct. 26, 1978, now abandoned.

The present invention relates to flow measuring systems, and more particularly to a branch averaging pitot system for sensing differential pressure within a flow stream and producing a corresponding differential pressure flow signal.

BACKGROUND OF THE INVENTION

In the past, the principal means of measuring flow in a gas or air stream was with the use of a single pitot having two pressure taps—one for measuring static head and one for measuring total static and velocity head. Such an arrangement only effectively indicated the velocity at one point in the flow stream. To obtain a more meaningful flow with such a pitot tube, it was necessary to scan the flow stream with the pitot. To scan the flow stream was difficult in itself, plus it was difficult to properly position the pitot with respect to the moving air or gas of the flow stream. In addition accuracy and effectiveness was influenced by the tendency of the pitot to plug, and the fact that the total system was not designed to be accurately responsive to very low differential pressures produced. Thus, the single pitot was never really effective enough to be widely accepted and used in commercial installations, and hence never enjoyed substantial success in such applications.

More recently, a type of branch averaging pitot system has been employed, such as that disclosed in U.S. Pat. No. 3,685,355. However, this type of air monitoring system has encountered some difficulties, and has never been accurate and precise enough for commercial installations. In particularly, the openings in the pitots are proned to becoming plugged, and even when only partially plugged, the air monitoring system loses much of its effectiveness.

SUMMARY OF INVENTION

The present invention provides a branch averaging pitot air monitoring system that is capable of providing a very accurate, repeatable differential pressure flow signal to a flow transmitter. Forming a part of this system is an array of total pressure shrouded pitots and an array of static pressure pitots, both array of pitots being strategically placed within an air receiving duct or measuring station down stream from a flow straightening section. The array of total pressure and static pressure pitots are each interconnected by a manifold, and wherein the respective manifolds are communicatively connected to said transmitter that is provided with means for directing a constant plugging.

It is, therefore, an object of the present invention to provide an accurate and reliable air flow primary and air flow monitoring system.

A further object of the present invention is to provide an air flow primary employing an array of total pressure pitots and an array of static pressure pitots, and a transmitter communicatively connected to said pitots and provided with means for directing a constant purge of air back through said pitots for eliminating plugging.

Another object of the present invention is to provide an air flow primary of the basic character described above where the actual pitot output is independent of Reynolds number, thereby giving rise to exceptionably high turn downs with respect to the pitot-static array.

Still a further object of the present invention is to provide an air flow primary of the basic character described above where the unrecovered head losses are very low.

Finally another object of the present invention resides in the provision of an air flow primary of the type described hereinabove wherein the same is capable of being effective up to 6,000 PPM velocities.

Other objects and advantages of the present invention will become apparent from a study of the following description and the accompanying drawings which are merely illustrative of the present invention.

DESCRIPTION OF PREFERRED EMBODIMENT

Figure 1:
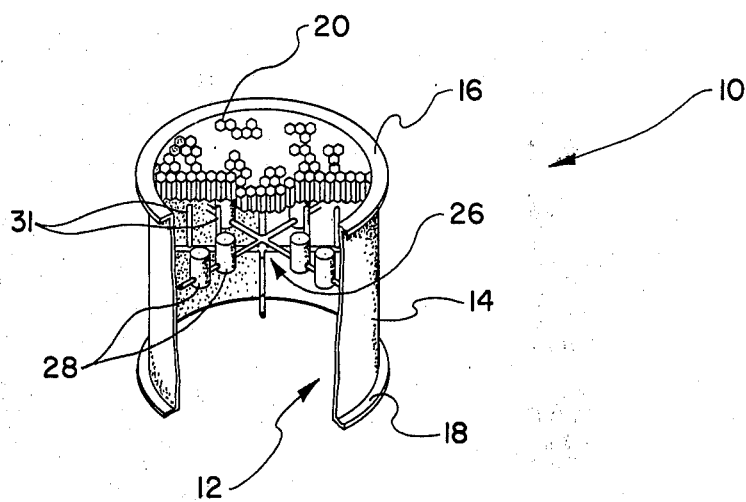
FIG. 1 is a perspective view of the air flow primary of the present invention with portions broken away to better illustrate the structure thereof.
Figure 2:
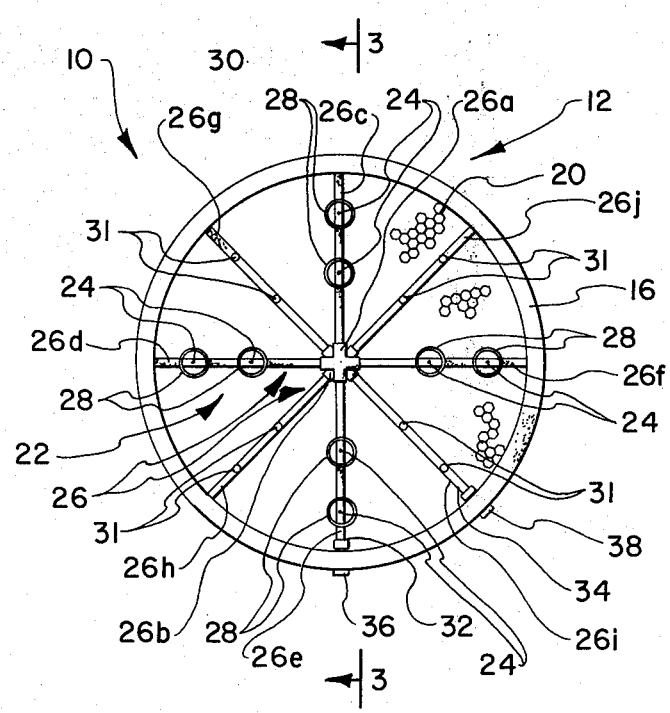
FIG. 2 is a side elevational view of the inlet end of the air flow primary of the present invention with much of the air flow straightening section being removed to better illustrate the internal structure thereof.
Figure 3:
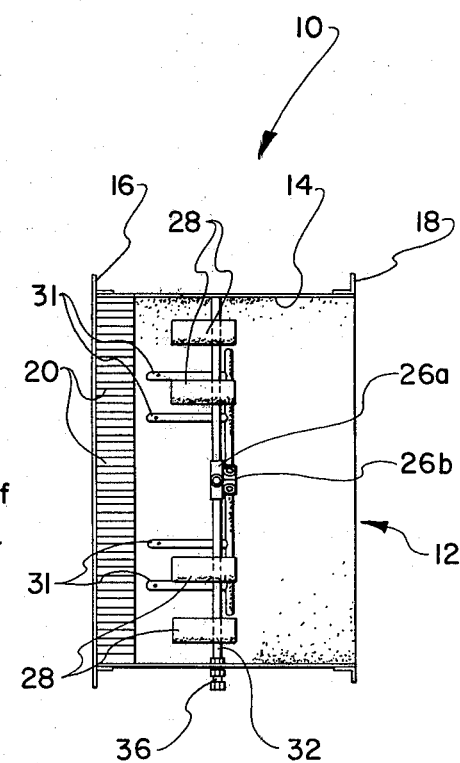
FIG. 3 is a side sectional view of the air flow primary taken along the lines 4—4 of FIG. 2.
Figure 4:
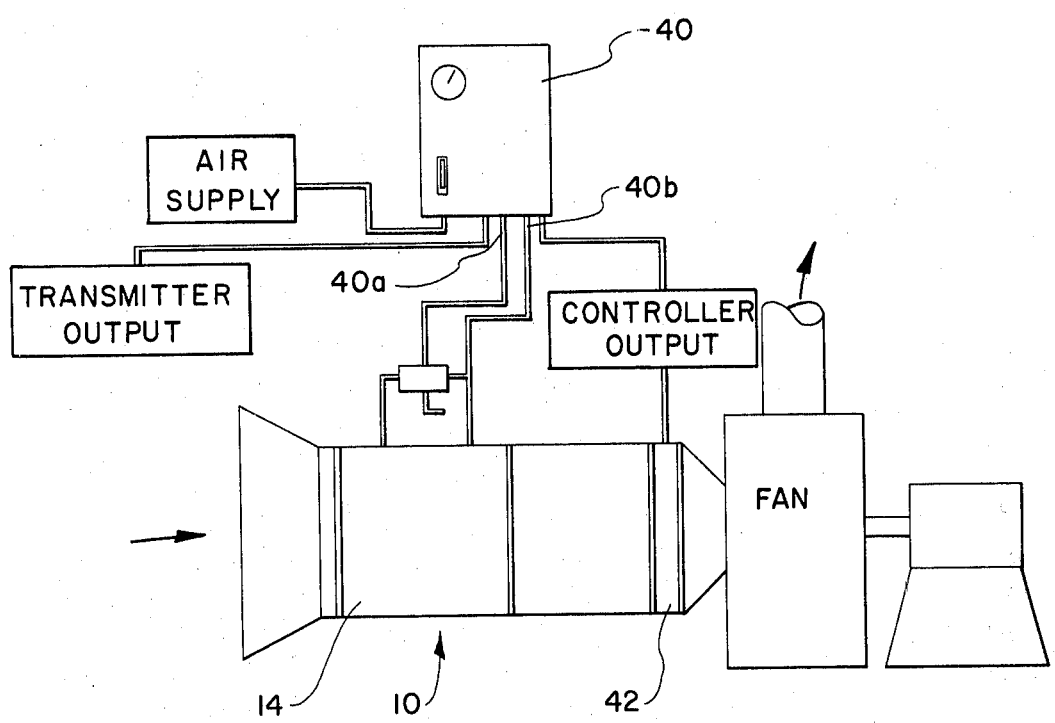
FIG. 4 is a schematic illustration of the air monitoring system of the present invention and how the same may be typically utilized.

With further reference to the drawings, the air flow primary of the present invention is shown in FIGS. 1, 2, and 3, and indicated generally by the numeral 10. Air flow primary 10 includes an air receiving duct section or assembly, indicated generally by the numeral 12, that is adapted to be connected within an air stream (as illustrated in FIG. 4) and when so connected serves as an air monitoring station. Air receiving duct section or assembly 12 can be of any desired shape and cross sectional area, but the particular design shown herein includes a generally cylindrical housing 14 with a pair of end flanges 16 and 18 that enables the same to be appropriately connected within a duct system.

Provided about the inlet end of the air receiving assembly 12 is a flow straightening section indicated by the numeral 20. The flow straightening section is intended to give substantially laminar flow and includes a honeycomb type of material including a multiplicity of hexagon-cell flow straightening passageways. In a typical twelve-inch diameter air flow primary, one could expect to find more than 1000 of such cells grouped in side-by-side relationship abut the entire cross sectional area of the air flow primary.

Continuing to refer to the air flow primary 10 of the present invention, down stream from the flow straightening section 20 is an array of total pressure pitots, indicated generally by the numeral 22, with each total pressure pitot being indicated by the numeral 24. The total pressure pitots 24 include an opening at one end, with the opening being generally parallel to a flow stream passing within the air receiving duct assembly 12. The size of openings of the total pressure pitots can vary, but for optimum results it is suggested that the individual pitot openings should be relatively small, between 0.030 and 0.060 inches diameter.

In order to yield an average pressure, the array of total pressure pitots 24 are interconnected by manifold means indicated generally by the numeral 26. In the particular embodiment disclosed herein, the manifold means 26 includes one manifold assembly having a tee section 26a that includes four radial manifold sections 26c, 26d, 26e, and 26f extending radially therefrom and supported within the inside wall of housing 14. To increase the accuracy of the total pressure pitots 24, there is provided a shroud 28 that generally surrounds and encases each of the total pressure pitots so as to minimize the effects of cross and angular flow components which can give rise to substantial inaccuracies.

In addition, the air flow primary 10 of the present invention is provided with an array of static pressure pitots indicated generally by the numeral 30 and including a plurality of static pressure pitots 31. The static pressure pitots 31 are connected to said manifold means 26, and are provided with relatively small openings (generally corresponding in size to the openings of said total pressure pitots) about the periphery thereof generally perpendicular to the flow stream passing through the air receiving duct section or assembly 12. As noted above, the static pressure pitots 31 are connected to the manifold means 26 and the manifold means 26 includes a separate section comprised of radial sections 26g, 26h, 26i, and 26j. As seen in FIG. 3, the respective radial sections supporting the static pressure pitots are generally angularly displaced 45 degrees about the central axis of housing 14 from the respective radial sections supporting the total pressure pitots.

Extending outwardly from the manifold means supporting the total pressure pitots is a connecting section 32; while another connecting section 34 extends from the manifold means, supporting the static pressure pitots, outwardly through housing 14 of the air flow primary. Couplings 36 and 38 are connected to the respective connecting sections extending through the housing 14, with the couplings 36 and 38 being adapted to be connected to the high and low inputs, 40a and 40b, respectively, of a differential pressure transmitter 40, as illustrated in FIG. 4. The differential transmitter 40 is preferably of the type produced by Brandt Industries, Inc., of Fuquay-Varina, N.C., and referred to as the Brandt 21DPT2000. Series Transmitter. Details of this transmitter are not dealt with herein in detail because such transmitters are now available commercially and the structure and function thereof are appreciated by those skilled in the art. Of particular importance in regards to the air monitoring system of the present invention, as illustrated in FIG. 4, is the fact that the transmitter 40 of the Brandt 21DPT2000 Series includes air flow purging means, wherein the transmitter actually directs a system of purging air from the transmitter, through the high and low inputs 40a and 40b thereof and into the manifold means 26 of the air flow primary 10, so as to continuously maintain the pitot openings of all of the pitots purged. The high input is connected to coupling 36 while the low input 40b is connected to coupling 38. The back pressure of the purging system of air exhausted through the respective pitots, is effective to produce a differential flow pressure signal that is received by the transmitter 40 and utilized in an appropriate fashion. It is appreciated that the transmitter may include an associated controller, as suggested in FIG. 4, so as to provide positive and responsive control down stream from the air flow primary. In such case, the controller would control a damper disposed in a section of the air stream denoted by numeral 42.

From the foregoing specification, it is seen that the present invention provides a highly accurate and precise system for determining differential pressure within a system of moving air or gas. The particular design of the total pressure and static pitots and their strategically designed disposition within the air flow primary coupled with the continuous purging action of the transmitter, assures very accurate and precise flow measurements and controls, with the added satisfaction that the total system is reliable and dependable and can be operated trouble free for long periods of time without maintenance or the requirement that the openings of the respective pitots be cleaned and unplugged.

The terms "upper", "lower", "forward", "rearward", etc., have been used herein merely for the convenience of the foregoing specification and in the appended Claims to describe the air monitoring system and its parts as oriented in the drawings. It is to be understood, however, that these terms are in no way limiting to the invention since the air monitoring system may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. An averaging pitot primary system for measuring air flow comprising: an air receiving duct assembly having air flow straightening means incorporated therein; an array of total pressure pitots strategically disposed about the cross sectional area of said air receiving duct assembly adjacent and down stream from said air flow straightening means, each total pressure pitot including an opening parallel with respect to said air receiving duct assembly and wherein the opening within a respective total pressure pitot is of a diameter between 0.030 inches and 0.060 inches; shroud means associated with said total pressure pitots and axially surrounding respective total pressure pitots for minimizing the effects of cross and angular flow; an array of single point static pressure pitots strategically disposed about the cross sectional area of said air receiving duct assembly down stream from said air flow straightening means, and wherein said single point static pitots face the oncoming air flow and includes an opening formed about the side thereof generally perpendicular to the direction of air flow within said duct; manifold means for operatively connecting respective pitots of said total pressure pitot array together, and for connecting respective pitots of said static pressure pitot array together; a differential pressure transmitter including an independent air supply for operating the transmitter operatively connected to said manifold means and further including pitot purge means for continuously purging said pitots by directing a system of air from the transmitter through the respective pitots wherein the back pressure sensed by said transmitter may be used to measure air flow through said air receiving duct assembly; and wherein said manifold means includes a first manifold connecting said static pressure pitots together and a second manifold connecting said total pressure pitots together, and wherein each of said manifolds is connected to a separate input of said transmitter; said first manifold that supports said total pressure pitots comprising at least four generally equally spaced radial sections that project outwardly from a central axis to where they terminate about an outer area of said air receiving duct assembly; and wherein said second manifold also includes at least four generally equally spaced radial sections projecting likewise from said central axis and which are disposed approximately 45 degrees out of phase with respect to the radial sections of said first manifold.

2. The averaging pitot primary system of claim 1 wherein there is provided a pair of inlet connections operatively connected to said manifold means internally within said air receiving duct assembly and which extends therefrom through said air receiving duct assembly where there is provided exterior of said air receiving duct assembly coupling means for allowing said inlet connections to be connected to the inputs of said transmitter exteriorly of said air receiving duct assembly.

3. The averaging pitot primary system of claim 2 wherein each of said manifolds are provided with a central tee coupler that couples said at least four radial sections thereof together.

* * * * *